United States Patent [19]
Osheroff

[11] Patent Number: 5,161,608
[45] Date of Patent: Nov. 10, 1992

[54] AIR CONDITIONING SYSTEM FOR A BUILDING

[76] Inventor: Gene W. Osheroff, 3932 Montego Dr., Huntington Beach, Calif. 92649

[21] Appl. No.: 868,467

[22] Filed: Apr. 14, 1992

Related U.S. Application Data

[63] Continuation-in-part of Ser. No. 584,260, Sep. 19, 1990, abandoned.

[51] Int. Cl.$^5$ .................. F25B 29/00; F24F 7/00; F24F 3/044
[52] U.S. Cl. .................. 165/22; 165/27; 236/1 B; 236/1 C; 236/49.3
[58] Field of Search .................. 165/22, 27, 16; 236/49.3, 1 C, 1 B

[56] References Cited

U.S. PATENT DOCUMENTS

| | | | |
|---|---|---|---|
| 3,612,164 | 10/1971 | Miner | 236/49.3 |
| 3,724,534 | 4/1973 | Weatherston | 236/1 C |
| 4,009,825 | 3/1977 | Coon | 165/22 |
| 4,487,363 | 12/1984 | Parker et al. | 236/49.3 |
| 4,530,395 | 7/1985 | Parker et al. | 236/49.3 |
| 4,646,964 | 3/1987 | Parker et al. | 236/49.3 |
| 4,819,716 | 4/1989 | Beachboard | 165/22 |
| 4,830,095 | 5/1989 | Friend | 165/22 |
| 4,886,110 | 12/1989 | Jackson | 165/22 |
| 4,890,666 | 1/1990 | Clark | 165/22 |
| 4,932,466 | 6/1990 | Foster | 236/49.3 |

Primary Examiner—John K. Ford
Attorney, Agent, or Firm—Poms, Smith, Lande & Rose

[57] ABSTRACT

An air conditioner for a building having a plurality of rooms has heating and cooling modes. A duct system connects the air conditioner to the individual rooms. A plurality of control valves are coupled to the duct mens for individually controlling the flow of air to each room. A first circuit is provided for generating a heating or cooling request signal from each room. A second circuit is provided for summing the number of the heating and cooling requests and providing summation signals of each. A third circuit is provided for sensing the greater of the two summation signals and activating the air conditioners to the mode corresponding to the greater of the summation signals. A fourth circuit is provided for activating the control valves controlling flow to the rooms which do not provide a part of the greater summation signal to the closed position. Additionally, a fifth circuit is provided for sensing changes in the summation signals when said air conditioner is in one of the modes and resetting the third circuit if the lesser of the summation signal becomes the greater summation signal.

16 Claims, 6 Drawing Sheets

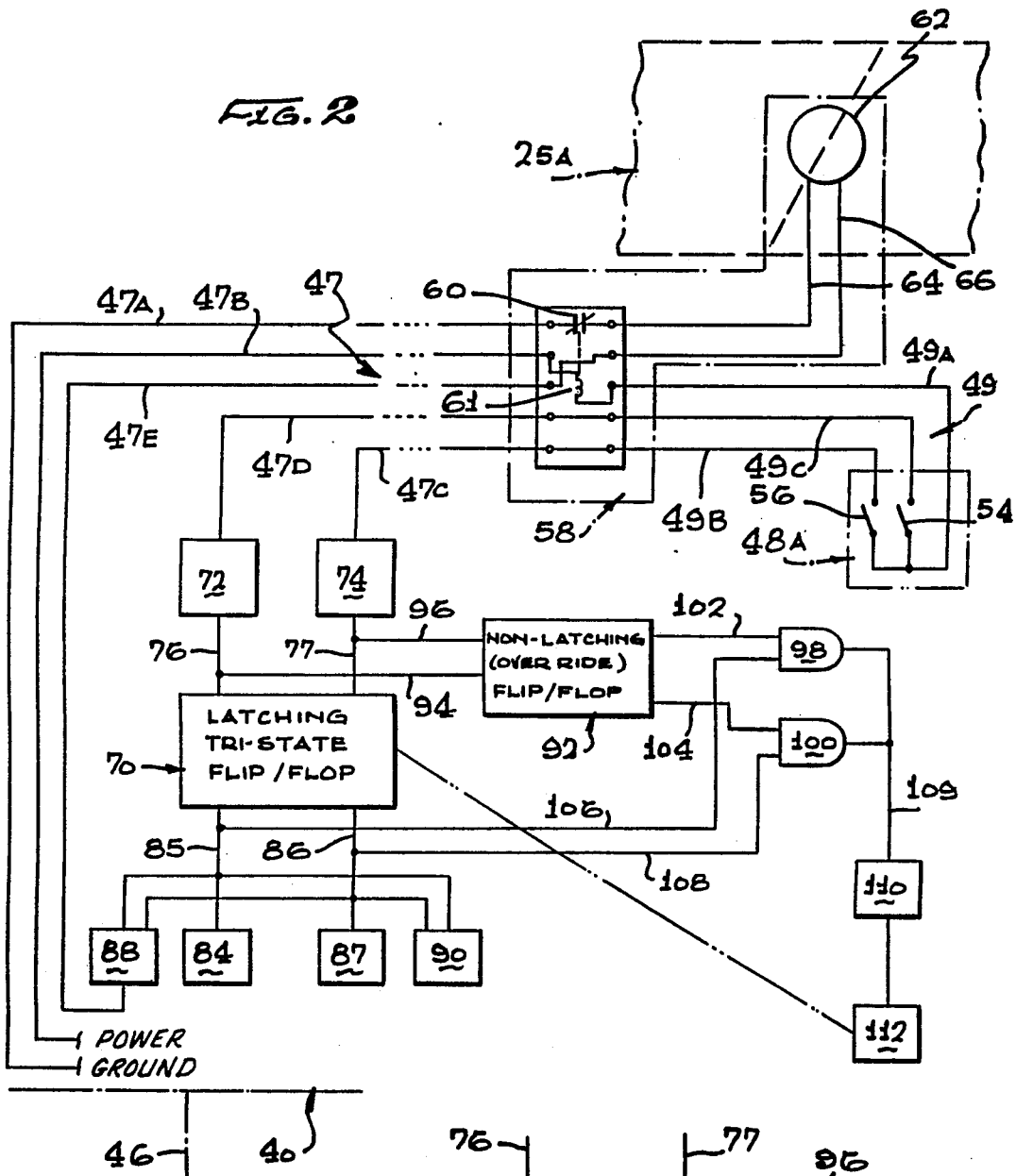
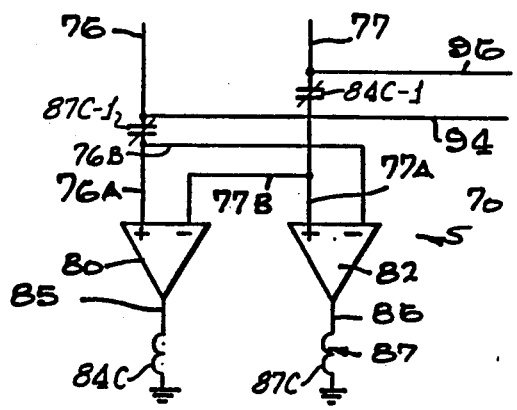

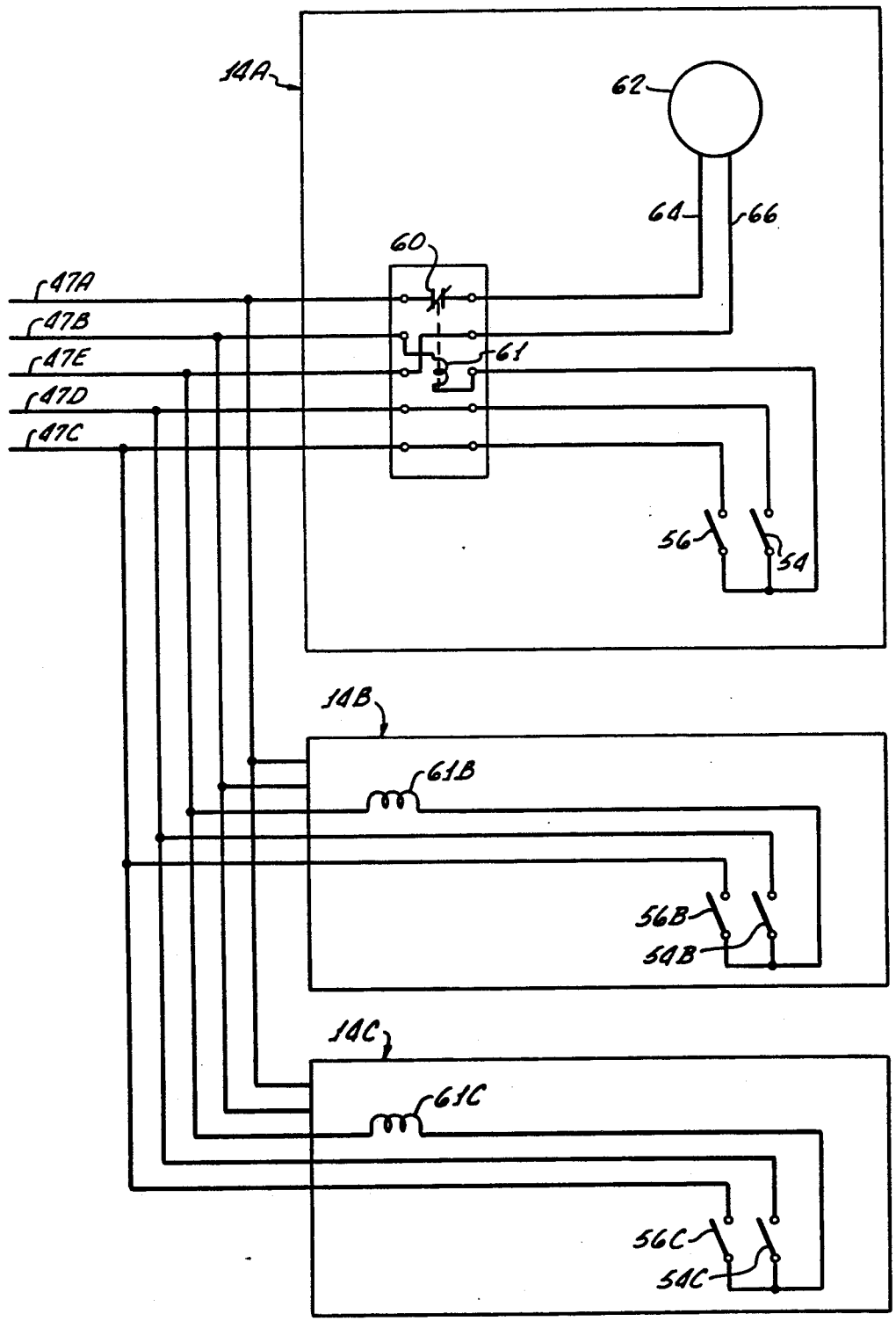

AIR CONDITIONING SYSTEM FOR A BUILDING

BACKGROUND OF THE INVENTION

This application is a continuation-in-part of U.S. patent application Ser. No. 07/584,260, filed Sept. 19, 1990 now abandoned.

2. Field of the Invention

The invention relates to the field of air conditioning systems for buildings and the like and, in particular, to a central air conditioning system with a temperature regulating system for controlling the temperature within individual rooms or zones.

FIELD OF THE INVENTION

Air conditioning systems vary greatly in complexity. Most systems for single family dwellings consist of a simple combined heating and cooling unit with a single thermostat in one room or hallway. The obvious problem is that there is no way to independently regulate the temperature in an individual room within the house; all the rooms are either heated or cooled simultaneously. This is not always satisfactory even in a small house, especially when someone is working in the kitchen over a hot stove while others are sitting comfortably in the living room. Thus, initial placement of the thermostat in the most appropriate location is critical. Yet, what most often occurs is a "fight" to control the thermostat and/or continuing adjustment of registers in the individual rooms.

On the other end of the scale is the dual duct system used in many office buildings. In this system separate central heating and cooling units are coupled to ducts which run throughout the building. At each room, heated and cooled air is tapped off from the individual ducts and mixed by means of a sophisticated valve assembly controlled by a thermostat mounted in the room. Such a system provides maximum temperature control over a given room or area of a building; however, it is obviously a very complex and expensive system. It is certainly too expensive for use in all but the most exclusive homes.

Of course, there are numerous air conditioning systems of complexity that varies between the above two extremes. Most all require complex wiring which increases their installation costs. However, most all work on the assumption that all the rooms or areas of the building require some degree of heating or cooling at the same time and, therefore, adequate control of the temperature can be obtained by use of "zone" located thermostats opening or closing individual room inlet ducts. This assumption is far from true most of the time. Therefore, what is needed is a system that provides most of the advantages of the dual duct system with far less complexity and cost allowing its use in both the home and commercial establishments.

Thus, it is a primary object of the subject invention to provide a central air conditioning system for a multiple room building that provides individual thermostat control of the temperature in a room.

It is another primary object of the subject invention to provide a central air conditioning system for a multiple room building that only supplies heated or cooled air to those rooms requiring a temperature adjustment.

It is another object of the subject invention to provide a central air conditioning system that has a simple wiring system.

It is further object of the subject invention to provide a central air conditioning system that is useable in both a home and commercial building.

It is a still further object of the subject invention to provide a central air conditioning system for a building that is inexpensive.

Another object of the subjection invention is to provide a communication system for heating or cooling free from DC voltage in the links, thereby avoiding the malfunctions to which DC systems are susceptible through interference from other signals.

SUMMARY OF THE INVENTION

The disclosed embodiment of the invention is an air conditioning system that is suitable for use in a single family dwelling as well as a large multistory commercial business established having a plurality of rooms. In detail, the system comprises a conventional central air conditioner which provides both heated and cooled air. A duct system couples the air conditioner to the individual rooms. A plurality of control valves (damper valves) mounted in the duct system control the airflow from the air conditioner to the individual rooms. Each of the individual valves includes a spring to bias it to its open position and a motor for driving the valve to the closed position.

A first circuit is included for generating cooling or heating request signals from each room which includes a set of normally closed relay contacts for each of the motors for controlling power thereto. A thermostat is located in each room for monitoring the temperature therein and includes cooling and heating request switches for activating the relay coils when they close. Therefore, in one embodiment a voltage drop across or a current component through an activated relay coil is a heating or cooling request signal unit from each room. A second circuit, comprising first and second measuring circuits, sums current components flowing through the relay coils that are activated by a closed cooling or heating switch of a thermostat, providing two separate cooling and heating summation signals respectively representing total cooling and heating calls from all rooms.

A third circuit is included for sensing the greater of the two summation signals and actuating the air conditioner to the corresponding mode. The third circuit comprises first and second air conditioner start relays for actuating the air conditioner to the cooling or heating modes, respectively. A latching tri-state flip-flop circuit is coupled to the measuring circuits for receiving cooling and heating summation signals and is also coupled to the first and second start relays for providing either a cooling or heating output signal for activating the corresponding start relay.

A fourth circuit is included which comprises a motor start relay adapted to activate the motors of the control valves for those rooms that do not provide a part of the greater summation signal upon receipt of an output signal from the latching tri-state flip-flop circuit.

A fifth circuit is included for sensing changes in any summation signals when the air conditioner is in one of the modes and resetting the third circuit (latching tri-state flip-flop circuit) when the lesser summation signal becomes a greater summation signal. In detail, the fifth circuit comprises a non-latching flip-flop circuit coupled to the measuring circuits for receiving cooling and heating summation signals therefrom and providing a cooling or heating output signal dependent upon which summation signal is greater. A first AND switch is included for receiving a cooling output signal from the latching tri-state flip-flop circuit and a heating output signal from the non-latching flip-flop circuit and providing an output signal if both are received. A second AND switch is included for receiving a heating output signal from the latching tri-state flip-flop circuit and a cooling output signal from the non-latching flip-flop circuit and providing an output signal if both are received. A reset circuit is provided for resetting the latching tri-state flip-flop circuit upon receipt of an output signal from either of the AND switches.

Finally, a time delay circuit is positioned between the reset switch and the AND switches to delay the start of a reset of the latching tri-state flip-flop circuit, and a second delay circuit is coupled to the latching tri-state flip-flop circuit for delaying the start of the air conditioner operating in one of the modes, both for preventing short cycling.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a schematic of the electrical control circuit in block diagram form for controlling the temperature within the individual rooms.

FIG. 3 is a simplified schematic of a tri-state latching flip-flop type circuit, which is part of the control system shown in FIG. 2, for sensing the number of rooms requiring a temperature change and signaling the air conditioner to supply heated or cooled air.

FIG. 4 is a simplified circuit showing the parallel connection of the single multi-wire line to a plurality of rooms.

DESCRIPTION OF THE PREFERRED EMBODIMENT

Figure 1:
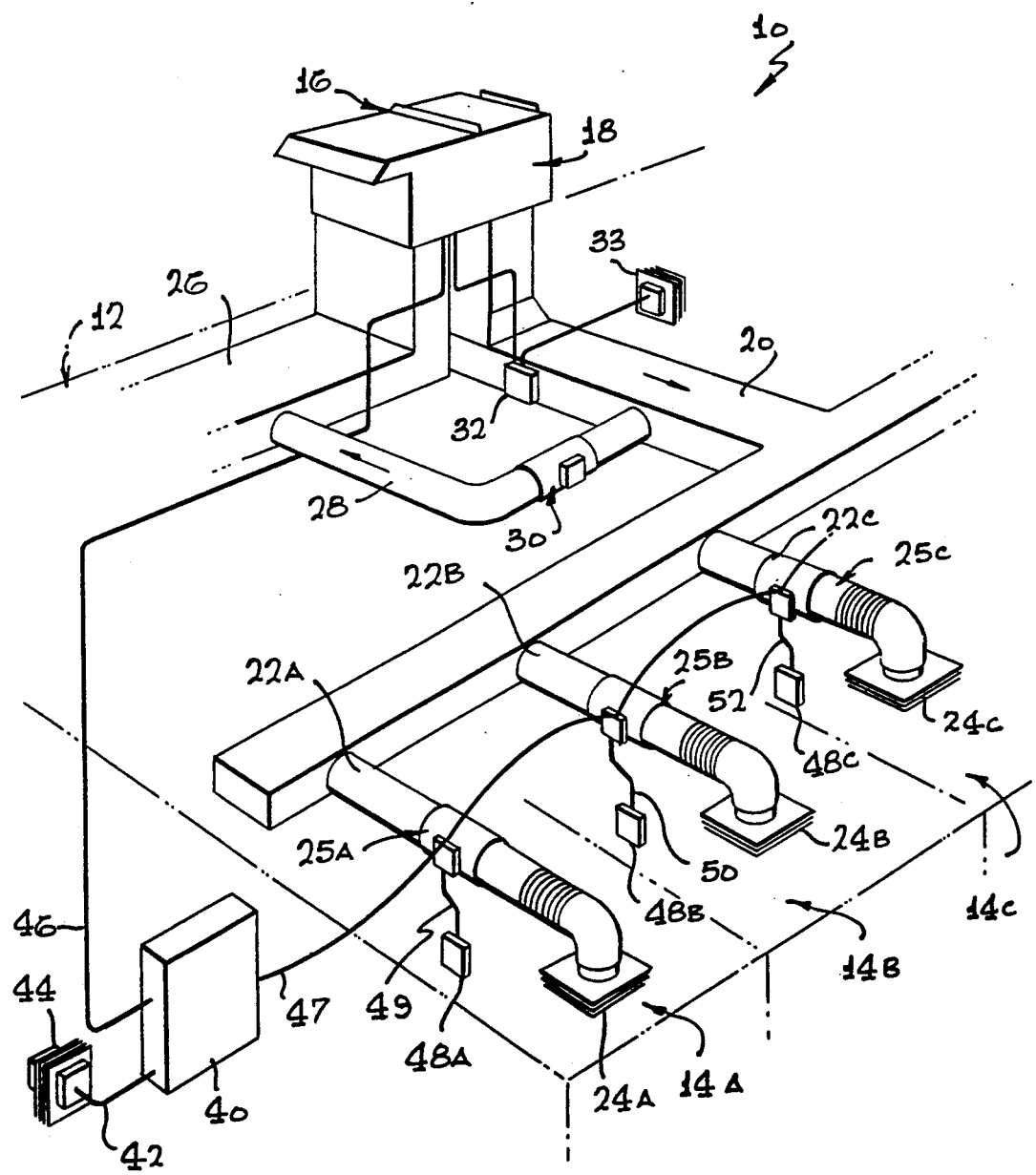
FIG. 1 is a semi-schematic type perspective view of the subject air conditioning system.

Illustrated in FIG. 1 is a semi-schematic perspective view of the subject air conditioning system, generally indicated by numeral 10. The air conditioning system 10 is shown located in a building 12 having a plurality of zones or rooms 14A, 14B, 14C. For purposes of illustration, only three rooms are shown, however many more rooms can be accommodated by the system. The system 10 comprises an air conditioner 16, having a control panel 18, with the capability of providing both heated and cooled air. However, while a combined unit is preferred, separate heating and cooling units coupled to the outlet duct could also be accommodated. The air conditioner 16 is coupled to an outlet duct 20 which runs throughout the building 12 in proximity to the rooms 14A-14C. Distribution ducts 22A, 22B and 22C are connected at one end to the outlet duct 20 and to the individual rooms 14A-14C via ceiling mounted room inlet registers 24A, 24B and 24C. Each duct 22A, 22B and 22C incorporates an electric motor operated duct damper valve 25A, 25B and 25C, all spring biased to the open position. These are typically butterfly type valves. An air return duct 26 is also coupled to the rooms 14A-14C (by connections not shown) and to the air conditioner 16. Typically, a bypass duct 28, with a bypass damper valve 30 mounted therein, is coupled between the outlet duct 20 and return duct 26. The damper valve 30 is used bypass air around the air conditioner 16 to prevent pressure buildup. Also included is a "leaving air" temperature controller 32, electrically connected to the control panel 18, mounted to the outlet duct 20 just down stream of the air conditioner 16. The controller 32 provides capacity control for a single or two-stage compressor system preventing cooling coil freeze up and short cycling. It is powered by a 24 volt transformer 33 coupled to an A.C. power source (not shown).

A system controller 40, the design and operation of which will be subsequently described, is coupled via a two wire line 42 to a 24 volt A.C. output of a transformer 44. The controller 40 is connected by a four wire line 46 to the control panel 18 and also to each damper valve 25A-C in parallel via a five wire line 47.

Thermostats 48A, 48B and 48C are mounted in rooms 14A-C, respectively, and are electrically coupled to the corresponding dampers 25A-25C by three wire lines 49, 50 and 52, respectively. The above description basically covers the physical layout of the air conditioning system 10 and the electrical control circuitry will hereinafter be described in detail.

The novel use and connection of the five wire line 47 to each of the controlled rooms and individual controls in each room form an important part of the simplification of the system described herein.

Illustrated in FIG. 2 is a schematic representation of the basic electrical circuitry in a block diagram form. For purposes of simplification, the control circuit 40 and only one thermostat 48A and one damper valve 25A and the circuitry of one individual room are illustrated and described in detail. However, it should be noted that all the thermostats and dampers and circuitry of all rooms are configured and function in an identical manner. FIG. 4 illustrates the parallel connection of the single multi-wire line 47 to each room. The thermostat 48A is a conventional design of the type having temperature and temperature set indicators (neither are shown) which can be manually adjusted to request either heated or cooled air.

If cooling is requested, a switch 54 is closed and, when heating is requested, a switch 56 is closed. When the requested temperature is reached, the closed switch automatically opens. The damper valve 25A incorporates a circuit panel 58 which includes a set of relay contacts 60, having an activating relay coil 61, and a motor 62 for driving the damper valve 25A to the closed position, cutting off air flow to the room 14A. A wire 47A (of the five wire line 47) is connected to the relay contacts 60, which in turn are connected to the motor 62 via a wire 64. A wire 47B is connected to one end of the activating coil 61 of the relay, while a wire 49A couples the other end of the coil to the switches 54 and 56. For reasons that will be subsequently discussed, all of the coils 61 of the relays of the circuit panels 58 of all rooms must be closely matched in resistance. The panel 58 also couples the output wires 49B and 49C from the switches 56 and 54 to wires 47C and 47D, respectively. Finally, wire 66 from the motor 62 is connected to the wire 47E. Twenty four volt A.C. power is provided from transformer 42 (FIG. 1) to the motor 62 via lines 47A and 47E, and to both thermostat switches 54, 56 via lines 47B and 49A and coil 61.

It is important to note that all the other thermostats, damper valves and control boards (of other rooms) are wired in a similar fashion. Furthermore, the other damper valves, thermostats and control boards (of other rooms) are wired in parallel with the thermostat 48A, damper valve 24A and control boards 58 of the room of which controls are illustrated in FIG. 2. Thus, should either of the switches 54 and 56 of any one room close, the relay coil 61 (of such room) is energized and will open normally closed contacts 60, "breaking" the circuit to the motor 62. This will cause the damper valve 25A to remain open for, as previously stated, the damper valves are spring biased to the open position. However, if none of the other switches 54 and 56 of the other thermostat 48B and 48C (of other rooms) have closed, the corresponding relay coils 61 of the other dampers will remain deenergized and their contacts 60 remain closed so that power applied via wires 47E and 47A will cause them to close.

Still referring to FIGS. 1 and 2, and additionally to FIG. 3, it can be seen that a latching flip-flop circuit 70 is incorporated into the controller 40. The switch 54 is coupled to a circuit 72 via wires 49C and 47D and switch 56 is coupled to a circuit 74 via wires 49B and 47C. Both circuits 72 and 74 are connected to the circuit 70 via wires 76 and 77, respectively. Circuits 72, 74 are bridge circuits that include, in this embodiment, a rectifying diode bridge and a measuring resistor, across which is measured the voltage drop caused by the total of all current components flowing in respective wires 47C and 47D and summed in the measuring circuit resistor (as will be described below in connection with the detailed circuit diagram of FIGS. 5A, 5B and 5C).

Illustrated in FIG. 3 is a schematic of a tri-state latching flip-flop circuit, indicated by numeral 70. The tri-state latching flip-flop circuit 70 is essentially a pair of summing amplifiers 80 and 82. The wire 76 splits, with one leg 76B coupled to the plus input of amplifier 80 and a leg 76A coupled to the minus input of the amplifier 82. The wire 77 splits, such that legs 77A and 77B are coupled to the plus input of amplifier 82 and the minus input of amplifier 80, respectively. The cooling output signal of the amplifier 80 is coupled via wire 85 to a relay coil 84C of a relay 84 and the heating output signal from amplifier 82 is coupled via a wire 86 to a relay coil 87C of a relay 87. Relays 84 and 87 activate the cooling and heating modes, respectively, of the air conditioner 16. A set of rely latch contacts 87C-1, operated by coil 87C, are connected in series in input line 76 to control the input to amplifier 80. A similar set of relay latch contacts 84C-1 in input line 77, operated by coil 84C, control the input to amplifier 82. In addition, the outputs of both amplifiers 80 and 82 are connected to a relay 88 (FIG. 2), which controls the power to the motors 62 in the control board 58 via wire 47E, to thereby control the position of all the damper valves 25A-C. In addition, both amplifiers 80 and 82 are connected to the air conditioner via a delay relay 90.

A non-latching (override or change over) flip-flop circuit 92 is connected on its input side to wires 76 and 77 via wires 94 and 96 (on the input side of the circuit 70) to receive summed cooling and heating calls and connected on its output side to AND switches 98 and 100 via lines 102 and 104, respectively. The switches 98 and 100 also are connected to wires 85 and 86 on the output side of the circuit 70 via lines 106 and 108, respectively, to receive as second inputs the latched summation signals indicating the prior heating or cooling condition. The output of the two switches 98 and 100 are joined and connected, via a wire 109, to a change over delay relay 110 and, thereafter, to a reset switch 112 coupled to and for resetting the circuit 70.

In operation, when a thermostat, such as thermostat 48A, is adjusted to provide heating for room 24A, switch 56 is closed. One unit or component of current flows through the coil 61 to circuit 74. The circuit 74 measures the total current in wire 74C, which is dependent upon the number of coils (of all rooms) in which current is flowing, because the coils 61 have closely matched resistance. Thus, each activated thermostat produces one "heat call" (from thermostat 48A), e.g. one current unit or component. In the example at hand, there is one heat call and no "cool calls" and, thus, the circuit 70 will latch in the heat mode. If there were a subsequent cool call from another thermostat (48B and 48C), it would be locked out. Thus, the relay 87 is activated, causing the air conditioner 16 to turn on in the heating mode.

The relay 88 is simultaneously activated, providing power to the damper motors which causes all the other damper valves 25B and 25C to close because "their" relay contacts 60 remain inactivated. However, current will not flow to the motor 62 of the room calling for heat, causing its damper valve to remain open. The air conditioner is also activated via delay relay 90 (typically a three to five minute delay) to prevent short cycling. If a cooling request had been made, instead of a heating request, the circuit 72 would have provided a cooling call to the circuit 70, activating cooling relay 84 and locking out relay 87, causing the air conditioner 16 to go into the cooling mode.

Had a cooling request been made, for example a cooling request in room 14B, after the heating cycle had been started, it would be ignored by the circuit 70 because signal calls are equally weighted (by use of relay coils 61 of equal resistance to provide heat or cool call current components of equal magnitude from each room) and the damper 14B would remain closed. However, if an additional heating request was made in room 14C, the damper valve 25C would open allowing the heated air to enter. The cooling request in room 14B would go unanswered until the desired temperature was reached in rooms 14A and 14C, at which point the switches 56 would open, eliminating the heating calls from the circuit 70.

In the previous example, if two cooling calls are made after the heating cycle had been initiated, for example from rooms 14B and 14C, the non-latching change over flip-flop circuit 92 would receive two cool calls and one heating call and would provide a cool call signal to the AND switch 100 (if there were two heat calls and one cool call the signal would go to AND switch 98). Since the AND switch also receives a heating output signal from down stream of the circuit 70, the switching conditions are met and an actuation signal is sent to the delay relay 110 (typically a 3-5 minute delay to prevent short cycling) and thereafter actuating the reset relay 112, which momentarily resets circuit 70 to the off position. The AND switches insure that the circuit 70 can latch and only be reset thereafter. This of course turns off the air conditioner 16. Thereafter, the circuit 70 "sees" the two cool calls and one heat call and latches in the cooling mode. The system has changed over to cooling mode. The damper valve 25A will now close and the damper valves 24B and 24C will open. Of course, if the reverse had been true, i.e., the circuit 70 had been latched in the cooling mode and two heat calls were received by the circuit 92, the AND switch 98 would receive a heat call and a cooling output signal downstream of the circuit 70 and would activate delay relay 110.

It now should be clear that, when all the heating and cooling calls are satisfied, the switches 54 and 56 will again open, causing either relays 84 or 87 to deactivate, turning off the air conditioner 16 as well as allowing all the closed damper valves to open. Thus, essentially the whole air conditioning system becomes "reset."

FIG. 4 illustrates, in a simplified form, the parallel connection of the single five wire cable 47 to three separate rooms each of which identically includes a control board 58, a damper motor 62 and thermostat switches 54, 56. Similar elements are connected identically in each room. As previously mentioned, the same system may be connected to more than three rooms and in fact may be connected in parallel to as many as twenty rooms. The five wire cable including the cool call line 47B and the motor power lines 47A and 47E are all connected to the room control system of each individual room. The five wires of the cable are similarly connected in parallel to the room control system of every room. Each room has, as previously mentioned thermostat switches 54, 56, one of which is closed when the thermostat calls for cooling or heating as the case may be. The damper motor 62 which controls flow of air into the individual room receives power on lines 64, 66 from wires 47A and 47E. The set of relay contacts 60, which are actuated by the relay coil 61, are connected in series in line 47A. Coil 61 is connected in series with both of the cooling and heating switches 54, 56. When either one of the thermostat switches closes, a component of current flows through the common relay coil 61. This current component has a magnitude determined by the resistance of the coil. As previously mentioned the resistances of each of these coils of the several rooms are closely matched, so that each component of current from each room will be of substantially equal of magnitude. Each thermostat switch (of each room), when closed, adds its own individual current component, having a magnitude controlled by the precise matched resistances of the coils 61, to the common line 47B (through the coil) and to one of the lines 47C or 47D. Accordingly, each of the lines 47C or 47D carries a total number of current components that is the same as the number of thermostat switches that have been closed and are calling for heating or cooling. Considering that each current component from each room is of equal magnitude, there is one unit of current provided by the closed switch of each room, and thus the total current flowing in the heat or cool call wires has a magnitude directly proportional to the total number of closed switches in the several rooms. Accordingly, the total currents in lines 47C or 47D are heat call or cool call summation signals. Magnitudes of these currents are measured in the circuits 72, 74 which also provide for rectification of the A.C. current by use of a diode bridge.

Thus, it is apparent that signals going into the circuits 72, 74 are signals representing the total number of heating or cooling calls from all rooms and thus comprise cool call or heat call signals that are indicative of the sum of the individual current components provided from those of the controlled rooms that are calling for heating or cooling. The summed currents are fed across a measuring resistor in the measuring circuit 72, 74 from which a voltage representing the magnitude of the cool call or heat call signal is provided to the latching tri-state flip-flop 70.

Figure 5A:
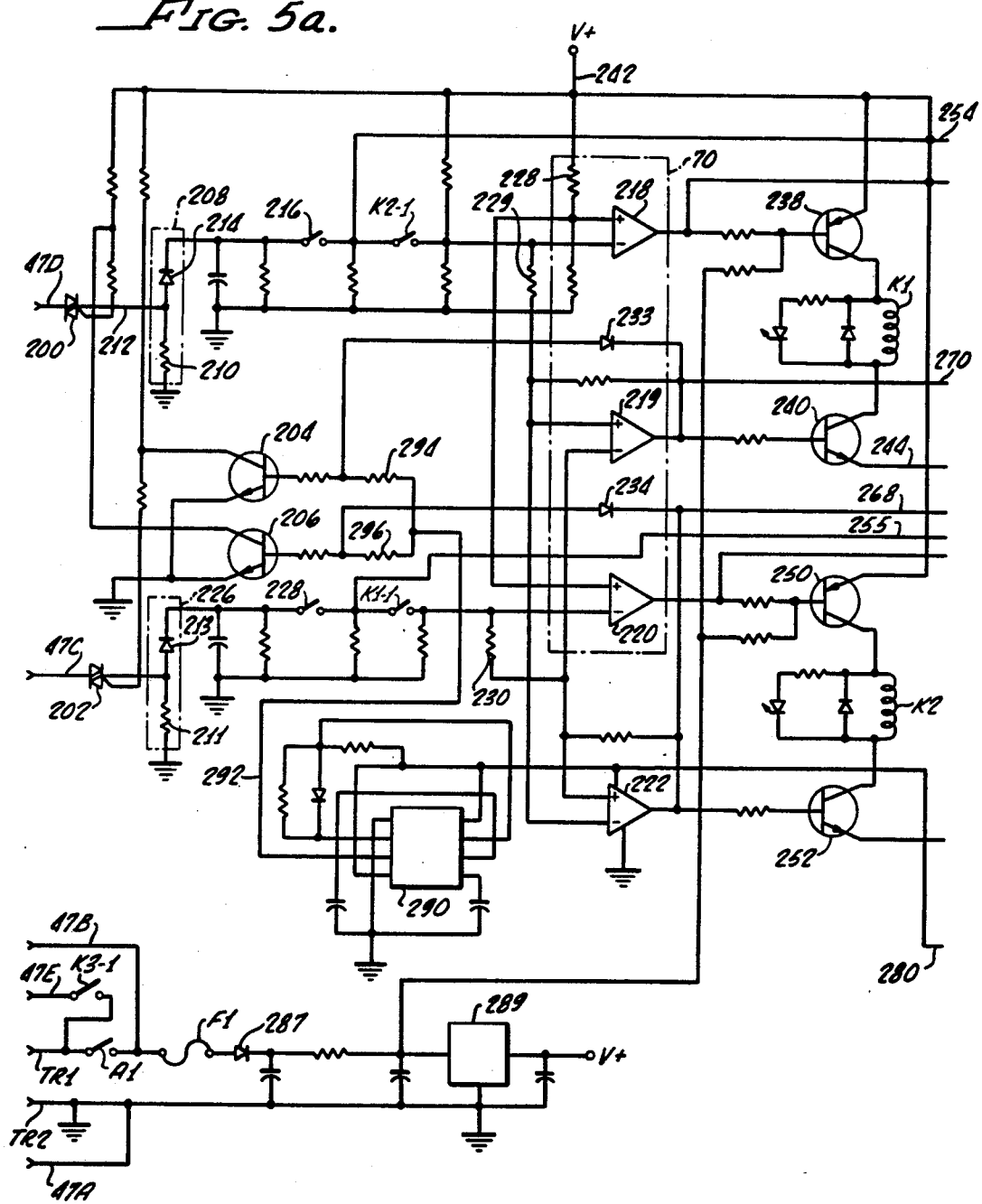
FIGS. 5 A, B, and C collectively comprise a schematic circuit diagram of a controller for the system.
Figure 5B:
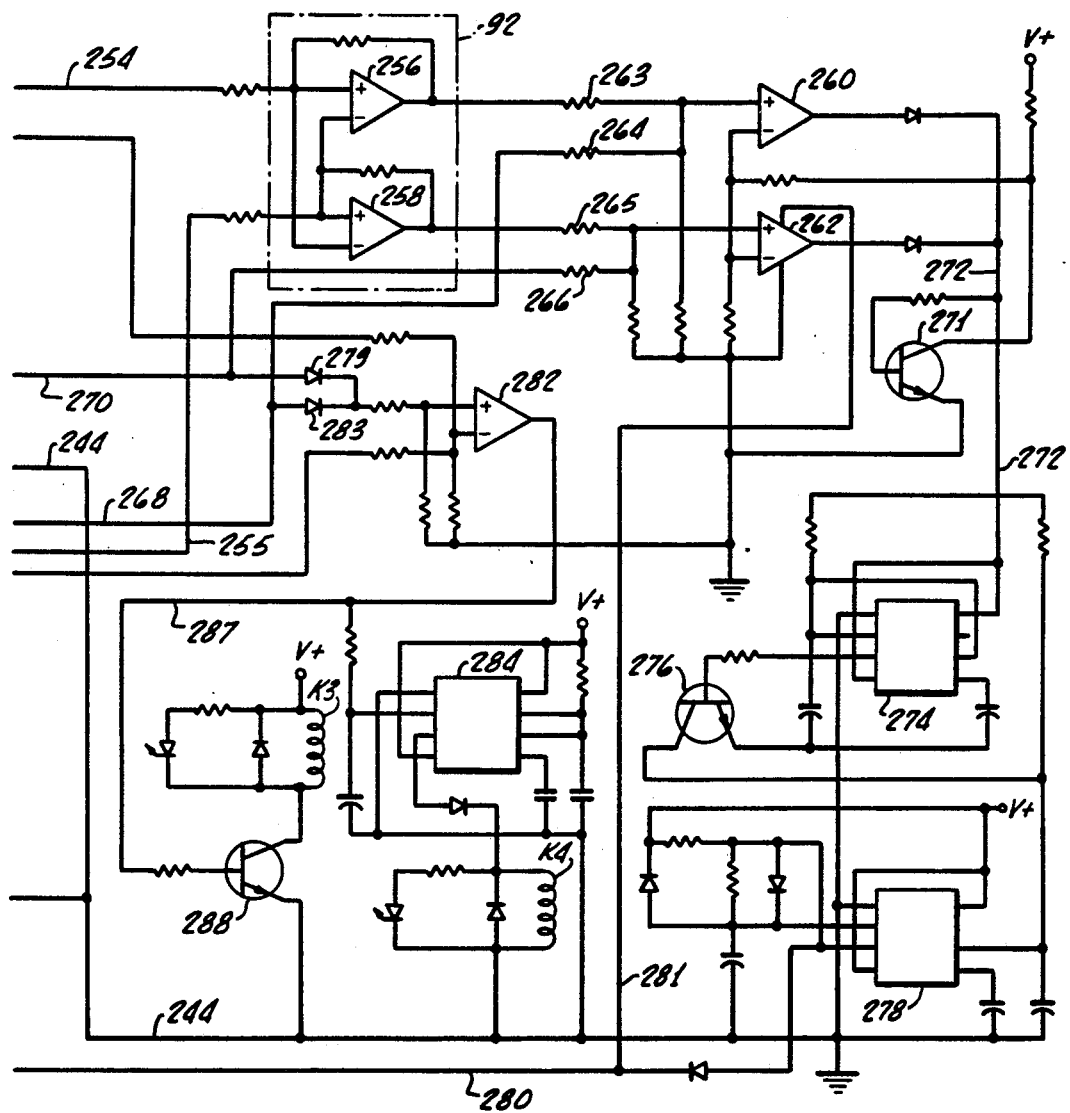
Figure 5C:
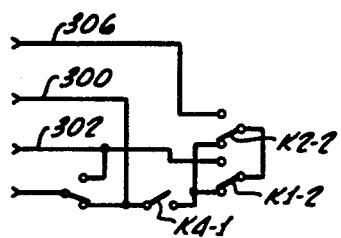

FIGS. 5A, 5B, and 5C collectively represent a detailed circuit diagram of the system controller illustrated in functional block form in FIGS. 2 and 3. The sum of cool call current components on line 47d and heat call current component on line 47c (shown at the very left side of FIG. 5A) are fed to respective ones of triacs 200, 202 which are respectively controlled by transistors 204, 206. The latter are provided to momentarily turn off both of the triacs and to turn off one or the other in heating or cooling mode for purposes to be described below. A cool call signal from triac 200 is fed to a rectifying and measuring circuit 208. Circuit 208 corresponds to measuring circuit 72 of FIG. 2. In the illustrated circuit 208 only a single diode instead of a diode bridge is employed for rectification of the 24 volt AC current on line 47d. The summation signal at the triac output is measured in circuit 208 as the voltage across a resistor 210 that is connected between ground and the junction of rectifying diode 214 and triac 200, at line 212. The rectifying diode 214 in circuit 208 passes the rectified cool call signal through an on/off switch 216 and thence through a set of normally closed relay latch contacts K2-1 (corresponding to latch contacts 87C-1 of FIG. 3) which feed the cool call signal to the inverting input of an operational amplifier 218 of the latching tri-state flip-flop 70. Latching tri-state flip-flop 70 comprises four operational amplifiers 218, 219, 220 and 222. All operational amplifiers in FIG. 5A and 5B are LM 324 chips, having four amplifiers to each chip.

In a manner similar to the handling of the cool signal, the heat call signal on line 47c is fed through a triac 202 and to a rectifying and measuring circuit 226, including a measuring resistor 211 and a rectifying diode 213 (equivalent to measuring circuit 74 of FIG. 2). The heat call signal is fed through an on/off heat control switch 228 and a set of normally closed relay latch contacts K1-1 (corresponding to latch contacts 84C-1 of FIG. 3) to the inverting input of operational amplifier 220 of the latching flip-flop 70. The cool and heat call signals at the inverting inputs of amplifiers 218 and 220 are compared with a small positive signal from a positive voltage supply fed via a resistor 228 to the non-inverting inputs of amplifiers 218 and 220. The cool call signal is also fed through a resistor 229 to the non-inverting input of operational amplifier 219, acting as a comparator, and to the inverting input of amplifier 222, also acting as a comparator of the tri-state flip-flop 70. The heat call signal is fed through a resistor 230 to the non-inverting input of comparator amplifier 222 and to the inverting input of comparator amplifier 219. Negative going signals at the outputs of each of amplifiers 219 and 222 are fed back to control the base electrodes of transistors 204, 206 via diodes 233, 234, respectively, so that the cooling triac 200 conducts and the heating triac 202 is turned off when the flip flop 70 latches in cooling mode and visa versa when the flip flop is latched in heating mode.

In the presence of a cool call signal, both amplifiers 218 and 219 of flip-flop 70 provide output signals to turn on normally non-conducting opposite polarity transistors 238, 240, which are connected in series between the positive voltage supply 242 and a ground line 244. Connected in series between the collectors of the transistors 238 and 240, is the coil K1 of the relay which operates latch contacts K1-1 in the heat call input to amplifier 220 from diode 213. Relay coil K1 is analogous to the coil 84C of relay 84 in FIG. 3. Receipt of a heating call by both amplifiers 220 and 222 on the heating side of the flip-flop 70, turn on normally non-conducting transistors 250, 252 which are also connected between the positive source and ground. A relay coil K2 (analogous to relay coil 87C of FIG. 3) is connected between the transistor collectors and actuates latch contacts K2-1 in the cool call input to amplifier 218. According to nomenclature employed herein a relay coil such as relay coil K1 is configured to operate relay contacts designated K1-1 etc., and relay coil K2 is configured to operate relay contacts designated K2-1 etc. Thus, with a cooling call signal fed to latching flip-flop 70 to energize coil K1, the latch contacts K1-1, in the input of the heat call line to amplifier 220 are opened to prevent a heat call signal from passing into the flip flop. Similarly, in the presence of a heat call signal fed through normally closed contacts K1-1 to the input of amplifier 220, coil K2 is energized to open normally closed contacts K2-1 which feed the cool call signal to the input of amplifier 218, whereby the flip-flop 70 is latched in one state or the other.

When flip flop 70 latches into heat call or cool call mode, one or the other of triac controlling transistors 204, 206 is operated to turn off the cool call triac 200 (in heat call mode) or the heat call triac 202 (in cool call mode). Thus, with a majority of rooms calling for heat, only those rooms making a majority (heat) call will have current flowing through their thermostat switches to open the local damper control contacts to open the local damper. Any room not calling for heat has no current flowing through its thermostat switch, because of the turned off cooling triac 200, and all dampers of such other minority rooms are closed. In like manner the turned off heat triac 202 in cooling mode, prevents current flow in the heat call line and dampers are closed in all rooms that are not calling for cooling.

The cool and heat call signals, at points ahead of the latching relay contacts K2-1 and K1-1 are fed via lines 254 and 255, respectively, to the non-inverting inputs of the flip-flop 9 which is formed of operational amplifiers 256 and 258. The cool signal on line 254 is also fed to the inverting input of operational amplifier 258 and the heating signal on line 255 is also fed to the inverting input of operational amplifier 256. The outputs of these amplifiers are fed via resistors 263, 265 respectively to the non-inverting inputs of operational amplifiers 260, 262, connected to operate as logical AND gates. The two input signals to each of the AND gate amplifiers are combined in resistive summing networks 263, 264 for amplifier 260 and 265, 266 for amplifier 262. The second input signal to AND gate 260 is fed through resistor 264 on a line 268 from the output of amplifier 222. The latter signals a present heating state by providing an output when a heating call has been received and the flip-flop 70 is latched in its heating state. Thus, the output of AND gate 260 provides a signal when (a) a cooling call is received and (b) the system is already operating in a heating mode. The combination means the system is calling for a changeover from heating to cooling.

Similarly, the second input signal to AND gate 262 is provided through input resistor 266 on a line 270 from the output of amplifier 219, whereby AND gate 262 will signal the request for a changeover if a heat call is received (via resistor 265) and the system is already operating in cooling condition. Call for a changeover is fed on a line 272, from the outputs of both AND gates to a timer 274 (analogous to delay circuit 110 of FIG. 2) having a period in the order of about 5 minutes. This is sufficient to delay the change over from heating to cooling or cooling to heating to ensure that the most recent call signals are not spurious. All timers are NE555 chips. At the end of the period of timer 274 a transistor 276 is operated to trigger a short interval timer 278 having an interval in the order of 2 to 5 seconds. The output of timer 278, via lines 280 and 281, is fed to the voltage supply inputs of operational amplifiers 222 and 262 which, therefore, are momentarily turned off.

Cool and heat call signals at the outputs of amplifiers 219 and 222 are fed via lines 270, 268 and diodes 279 and 283 to the non-inverting input of an operational amplifier 282 which triggers a timer 284 (analogous to delay 90 of FIG. 2) that generates a short time delay, which may be about 2½ minutes, to energize a relay coil K4 that operates a set of contacts K4-1 (FIG. 5C) to control power to the air conditioner unit. At the end of the time delay of timer 284 relay coil K4 is deenergized to allow the air conditioner unit to run.

The output of amplifier 282, via a line 287, also causes conduction of a transistor 288 connected to energize a relay coil K3 which itself operates a set of normally closed damper motor power relay contacts K3-1, (FIG. 5A) connected in the line 47E that supplies A.C. power to all damper motors 62 via contacts 60 (FIG. 2) of each individual room. Thus, relay coil K3 and its contacts K3-1 control power to all damper motors. Accordingly, when there is a call for heating or cooling, amplifier 282 turns on transistor 288 to energize relay coil K3, so as to apply power to the damper motors. This prevents the dampers from operating until the control board is ready for heating or cooling operation.

A.C. power from the 24 volt transformer is applied to the circuit of FIGS. 5A, 5B and 5C via lines TR1 and TR2, a power switch A1 and a fuse F1. Rectified and regulated voltage for the several components of the circuit is provided by a regulator 289 that receives half wave rectified 24 volt A.C. power via a diode 287.

A pulse generating circuit 290 provides a very short pulse at selected intervals, such as, for example, every 45 seconds, that allows the system to periodically monitor the heat call and cool call lines for a required change. Upon occurrence of each pulse from pulse generator 290 a signal is sent on line 292 via resistors 294 and 296 to the base electrodes of both of transistors 204, 206. Both of the latter are accordingly operated to momentarily turn on both triacs 200 and 202 and allow both heat and cool call signals to be fed to flip flop 92. Upon termination of the short pulse from the pulse generator 290 the triacs are again free to conduct and the system operates as previously described to determine whether or not a cool or heat call signal is being received.

When heat or cool call signals (or both) arrive at the inputs to flip-flop 92, that call with the higher voltage level (the voltage measured across resistor 210 of circuit 208 or resistor 211 of circuit 226), will turn on one of the cool or heat changeover AND gates 260, 262 if a changeover is requested. If a cooling call is received while the system is in heating mode a changeover is required. Similarly, if a heating call is received while the system is in cooling mode a changeover is likewise required. The changeover signal on line 272 energizes transistor 271 to start the 5 minute timer 274. At the end of this timing cycle, timer 278 and amplifier 282 operate to release the cooling and heating latches, allowing the latching flip-flop 70 to see both incoming heating and cooling calls. At the end of the short release time the system will latch onto that one of the two calls which is of greater magnitude. When there are no heating or cooling calls and all time delays are satisfied, all damper motors are deenergized and the dampers are in open position to provide ventilation for the building.

Illustrated in FIG. 5C is a circuit showing switching arrangements for control of the heater and air conditioning unit. Power on a line 300 is fed through normally closed relay contacts K4-1, operated to open position upon energization of relay coil K4, and thence through either of two paths, depending upon the position of contacts K1-2 or K2-2. Power is fed to the compressor of the air conditioning unit on a line 302 via relay contacts K4-1 (closed), K2-2 (closed) and K1-2 (open). K2-2 and K1-2 contacts are shown in normally closed position. Contacts K1-2 are operated by the cooling relay coil K1. If a heating call signal is provided, heating relay coil K2 is energized, contacts K1-2 are in their normally closed position, illustrated, and contacts K2-2 are moved from the illustrated normally closed position to the open position to feed power from line 300 through closed contacts K4-1, closed contacts K1-2 and actuated (opened) contacts K2-2 to a line 306 connected to energize the heater.

Although FIGS. 5A, 5B and 5C show a hard wired electronic circuit for mechanization of the system controller, it will be readily understood that all of the controller functions, including the operation of the several relay coils and their contacts, may be carried out by a microprocessor or an appropriately programmed general purpose computer.

Figure 6:
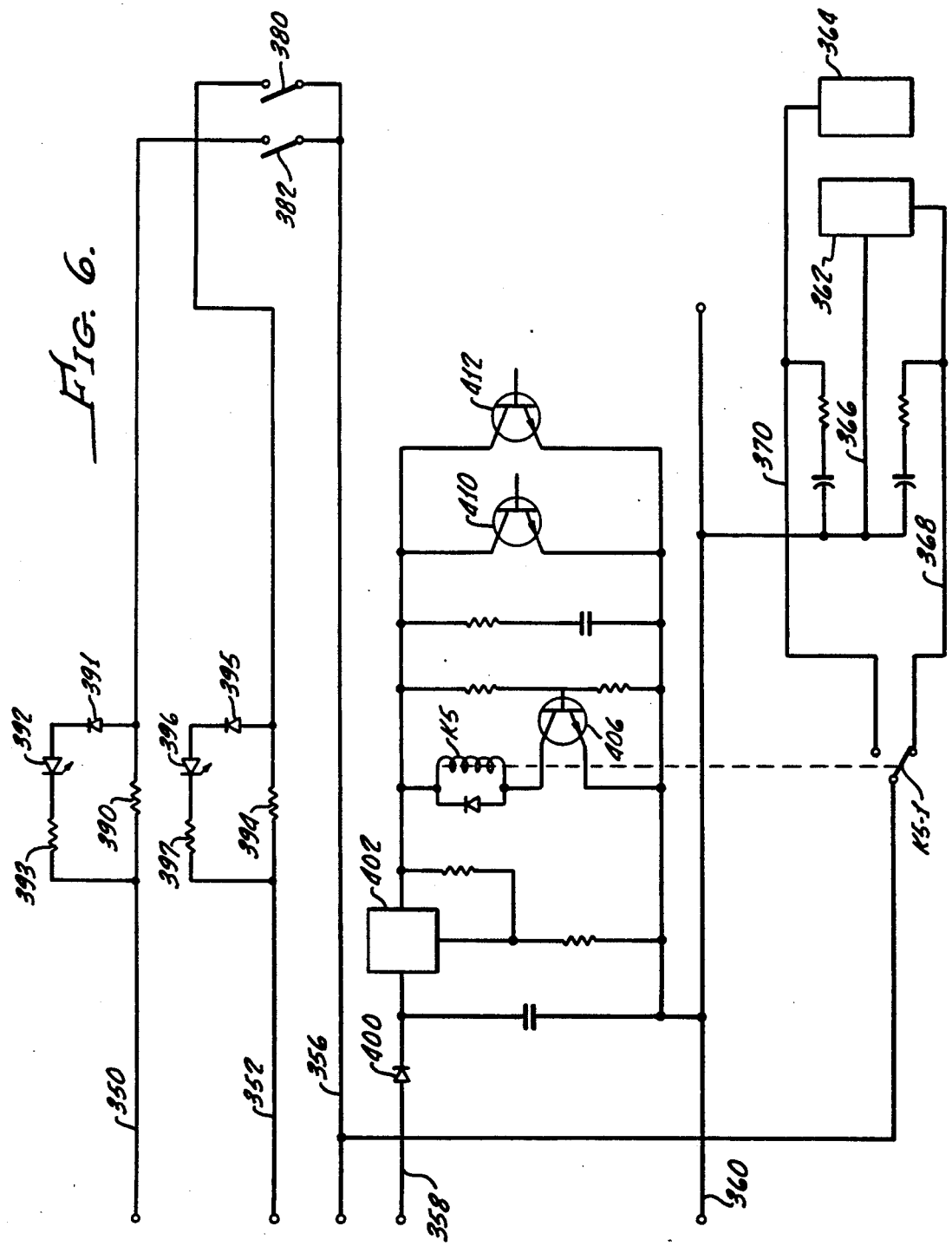
FIG. 6 shows a modified individual room control having optical coupling of the thermostat heating and cooling call signal lines to the damper motor control relay coil.

Illustrated in FIG. 6 is a modification of the circuit for each individual room to enable generation of more precision heat or cool call current components from each room. The arrangement illustrated in FIG. 6 employs a control board, damper and thermostat all analogous to the control board 58, damper 62 and thermostat 48a of FIG. 2.

The single five wire line 47 is connected to the main controller 40 (FIG. 1) and in parallel to all rooms as described above. The five wire line includes a heat call line 350, a cool call line 352, an input power line 356, which provides power to both thermostat switches and the damper motor, a cool or heat call sensing relay power line 358 and a second power line 360 for the damper motors. In this embodiment, first and second damper motors 362, 364 are provided to run the damper to closed and open position, respectively. The damper motors are energized by a common ground line 366, connected with line 360, and by individual lines 368, 370, for motors 362 and 364, respectively. Lines 368 and 370 are energized via relay switching contacts K5-1, from line 356 so that one motor or the other is energized depending upon the position of the relay switch contacts.

The cooling and heating thermostat switches are illustrated at 380 and 382, respectively, and are connected in common to line 356. Heating switch 382 is connected through a resistor 390 to the heat call line 350. The latter is connected to the heat call lines of all of the other rooms, as illustrated in FIG. 4. Connected across resistor 390 is a series circuit including a rectifying diode 391, a light emitting diode 392 and a second resistor 393. In a like manner the cool thermostat switch 380 is connected to cool call line 352 via a resistor 394 across which is connected a series circuit formed by a rectifying diode 395, a light emitting diode 396 and a second resistor 397. All circuits 390-393 and 394-397 of all rooms have matched components so that heat and cool call current components of all rooms have the same magnitude. Alternatively, components of selected rooms may be weighted so as to give a greater degree of control the to the selected rooms, as will be described below.

Power on line 358 is fed through a rectifying diode 400 to a voltage regulating circuit 402 and thence through a relay coil K5 connected in series between the output of regulator 402 and ground line 360. A coil controlling transistor 406 is connected in series between the line 360 and coil K5.

Connected in parallel across the series combination of coil K5 and transistor 406 are first and second light sensing transistors 410, 412, which are optically coupled with (positioned physically adjacent to) the respective light emitting diodes 392 and 396. Thus, for example, light emitting diode 392 and optical sensor 410 form a first optical coupler for coupling the circuit that actuates coil K5 to the heat call line 350 and the light emitting diode 396 and light sensing transistor 412 form a second optical coupler that couples the cool call line 352 to the relay coil operating circuit.

If heating is requested by the room containing the thermostatic switch 382, the latter closes and a heat call current component flows from line 356 through the closed switch 382 and thence through the parallel paths of resistor 390 and light emitting diode 392. The heat call current component, having a magnitude controlled by elements 390-393 flows through line 350 to measuring circuit 74. Flow of current through diode 392 generates light that is received by light sensing transistor 410, which accordingly, is driven into conduction. Conduction of normally non-conducting transistor 410 (transistor 412 is also normally non-conducting) drives switching transistor 406 into conduction, thereby completing a circuit from line 358 to line 360 through the relay coil K5. Energization of relay coil K5 actuates relay switch contacts K5-1 from the "normally closed" position (illustrated in FIG. 6) to the other, open position. In normally closed position of contacts K5-1 (relay coil K5 not energized), current to closing damper motor 362 flows from line 356 through switch K5-1, through closing motor 362 and back to line 360 via line 366. Energization of relay coil K5, upon occurrence of a heat or cool call, drives relay contacts K5 to the open position, in which the run open motor 364 is energized. Accordingly, without a heating or cooling call the dampers (of those rooms not calling for heating or cooling) are in closed position. When one or more of the rooms are calling for heating or cooling dampers in those rooms are opened.

If cooling is requested by those rooms containing thermostat switch 386, current flows through resistor 394 and also through light emitting diode 396. Light emitted by this diode is received by light sensing transistor 412 which operates in the same manner as transistor 410 to drive transistor 406 into conduction and thus energize the relay coil. Accordingly, both heat and cool calls from the thermostat switches are optically coupled to a driving circuit for relay coil K5. The latter is functionally analogous to coil 61 of FIG. 2 in that both control (open) the damper of the individual room upon occurrence of a heat or cool call from such room.

The arrangement of FIG. 6 employs resistors 390 and 394 as the primary controls of magnitude of current flow in the heat call and cool call lines 350, 352. Resistors 390 and 394 have considerably less resistance than the resistors 393 and 397 and other components in the circuits connected in parallel with resistors 390, 394. The resistance of the resistors 392, 393, 394, 397, and also the resistances of the several diodes are more readily and more precisely controlled and repeatable than are resistances of a wound relay coil such as relay coil 61 of FIG. 2 and coil K5 of FIG. 6. Thus, the use in the arrangement of FIG. 6 of more precise current magnitude controlling elements insures that each current component from each of the rooms has the same magnitude. Moreover, the optical coupling electrically isolates the heat call and cool call circuits from the relay coil circuit.

The controller illustrated in the circuit diagram of FIGS. 5A and 5B is coupled with the individual room circuitry illustrated in FIG. 6 in the same manner as previously described. In this arrangement power to the damper motors and to the thermostat switches is controlled by relay coil K3 via contacts K3-1, shown in FIG. 5A and 5B.

The systems previously described herein employ equal weighting of all cool calls and heat calls. This is achieved in the first embodiment by making the resistances of each of the current magnitude determining coils 61 all equal to one another, and in the embodiment of FIG. 6 making the net resistances of all components of the light emitting diode circuits in the heat and cool call wires all equal to one another. It will be readily understood that the various heat call and cool call signals can be selectively weighted so that one or more rooms can provide a call which will be of larger magnitude so as to override a smaller magnitude call from another room. Thus, for example, the resistance of coil 61 in room 14A (FIG. 4) may be half or one-third that of the resistance of the coils 61B and 61C of rooms 14B and 14C (which mutually equal resistance). With such weighting, if room 14A is calling for heating and one of the other rooms 14B or 14C is calling for cooling, the system will go into the heating mode because of the greater weighting applied by the resistance of coil 61 of room 14A.

Prior systems employing microprocessor control generally provide DC signalling between the controller and each of the individual zone controls. Such DC wiring is prone to pick up stray electrical signals, and thus spurious signals will be transmitted between the central controller and the various zones controlled thereby. In the present system, however, all of the five wires of the single cable that is connected in parallel to all of the rooms are provided with 24 volt AC current, and thus system, and particularly the microprocessor of the controller, has increased immunity to spurious signal reception.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What is claimed:

1. In an air conditioning system for a building having a plurality of rooms, said system comprising an air conditioner having heating and cooling means, a system of ducts coupling the air conditioner to individual ones of said rooms, a plurality of control valves each individual to different ones of said rooms for controlling air flow from said ducts to an individual room, a plurality of motors each individual to one of said rooms for individually operating respective ones of said control valves, a plurality of thermostats each individual to one of said rooms and having heat and cool switches operable between open and closed positions for generating heat call and cool call signals in accordance with temperature in respective rooms, and a plurality of motor control means each individual to one of said motors for controlling such motor to operate an associated valve, the improvement comprising:

an electrical line having a heat call wire and a cool call wire, each connected in parallel to the switches of each of said thermostats, means for energizing said wires to flow electric current in parallel to all of said thermostat switches and to flow current components individually through those of said switches in closed position, said motor control means respectively being connected in circuit with the switches of individual ones of said rooms for controlling the current components flowing through those of said switches in closed position, whereby current components flow through said heat call and cool call wires from each of said switches in closed position, means coupled with said cool call wire for generating a cool call signal indicative of the sum of current components in said cool call wire, and means coupled with said heat call wire for generating a heat call signal indicative of the sum of current components in said heat call wire.

2. The improvement of claim 1 wherein said electric line has a third wire connected in parallel to each of said motor control means for operating an associated valve to open position.

3. The improvement of claim 2 wherein said third wire is connected through said control means to both of the heat and cool switches of each said room.

4. The improvement of claim 2 wherein each of said motor control means comprises a relay coil configured and arranged to control an associated valve, and means responsive to flow of a current component in one of said heat and cool call wires for energizing said relay coil.

5. The improvement of claim 4 wherein said electrical line has fourth and fifth wires connected in parallel to each of said motors for providing power thereto, each of said fourth wires being connected to a set of relay contacts in each said room that are connected to be operated by the relay coil of each such room.

6. The system of claim 1 wherein said motor control means of one of said rooms comprises means in said one room responsive to a current component of a switch of said one room for generating an optical signal, and means in said one room responsive to said optical signal for enabling flow of electrical power to the motor of said one room.

7. The system of claim 1 wherein the motor control means of one of said rooms comprises first and second electro-optic light generating devices respectively connected to said heat and cool switches to flow one of said current components therethrough, a motor switch in said one room for controlling flow of power to the motor of said one room, coil means in said one room for operating said motor switch, first and second light sensors coupled optically to respective ones of said light generating devices, and means for energizing said coil means in response to either of said sensors.

8. An air conditioning system for a building having a plurality of rooms connected with a heating and cooling air conditioner by a plurality of ducts comprising:
- a plurality of separate room control systems each individual to a single room, each said separate room control system comprising:
  - a thermostat having heat call and cool call switches each operable to a closed condition wherein the switch calls for heating or cooling,
  - a control valve connected to control air flow to the room from said ducts,
  - a motor for operating the valve to at least a closed position, and
  - a motor control for controlling the valve,
- means in each room responsive to closed condition of one of the switches in such room for generating a single heat current component or a single cool current component indicative of closed condition of the heat call and cool call switches respectively,
- heat call and cool call wires connected to the respective switches of each room and connected in parallel to all rooms,
  - said heat current components from all rooms being transmitted along said heat call wire and said cool current components from all rooms being transmitted along said cool call wire, and
- means coupled with said heat call and cool call wires for generating heat call and cool call signals indicative respectively of the sum of said heat current components and said cool current components.

9. The system of claim 8 wherein the motor control of each said room, includes means responsive to one of said current components in such room for energizing the motor to operate the valve of such room to open position.

10. The system of claim 9 wherein said means for energizing the motor comprises a relay having a coil and a set of contacts operated by said coil.

11. The system of claim 10 wherein said coil is connected in circuit with both said heat call and cool call wires.

12. The system of claim 10 wherein said coil is connected with said switches to flow either of said cool current component and said heat current component through said coil.

13. The system of claim 9 wherein said means for energizing the motor comprises optical means responsive to one of said current components for energizing said motor.

14. The system of claim 9 wherein said means for energizing the motor comprises switch means for controlling energization of the motor, coil means for actuating the switch means, and optical means responsive to either of said current components for energizing said coil means.

15. The system of claim 9 wherein said means for energizing the motor comprises first and second light emitting semi-conductors coupled with said switches to be energized by respective ones of said current components, a motor switch for energizing the motor, coil means for operating the motor switch, and first and second light sensors, each individually responsive to light emitted by a respective one of said semi-conductors for energizing said coil means upon generation of one of said current components.

16. The system of claim 8 wherein said means for generating a single heat or a single cool current component comprises means for weighting said components to provide components of different magnitudes from at least some of said rooms.

* * * * *